(12) United States Patent
Zhang et al.

(10) Patent No.: US 10,068,345 B1
(45) Date of Patent: Sep. 4, 2018

(54) IMAGE SERIES ALIGNMENT SYSTEM AND METHOD

(71) Applicant: KING ABDULLAH UNIVERSITY OF SCIENCE AND TECHNOLOGY, Thuwal (SA)

(72) Inventors: Daliang Zhang, Thuwal (SA); Yu Han, Thuwal (SA); Kun Li, Thuwal (SA); Yihan Zhu, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 15/896,610

(22) Filed: Feb. 14, 2018

Related U.S. Application Data

(60) Provisional application No. 62/608,966, filed on Dec. 21, 2017, provisional application No. 62/490,968, filed on Apr. 27, 2017.

(51) Int. Cl.
*G06T 7/37* (2017.01)

(52) U.S. Cl.
CPC ...... *G06T 7/37* (2017.01); *G06T 2207/10016* (2013.01); *G06T 2207/10056* (2013.01); *G06T 2207/20056* (2013.01)

(58) Field of Classification Search
USPC ............................................. 382/294
See application file for complete search history.

(56) References Cited

U.S. PATENT DOCUMENTS

| 7,557,929 B2 * | 7/2009 | Fang-Yen | G01B 9/02072 356/484 |
| 8,280,695 B2 * | 10/2012 | Neelamani | G01V 1/36 367/73 |
| 2011/0174972 A1 | 7/2011 | Duden | |
| 2015/0214001 A1 * | 7/2015 | Buijsse | H01J 37/20 250/307 |
| 2015/0264250 A1 * | 9/2015 | Ou | G06T 7/0012 348/77 |

(Continued)

OTHER PUBLICATIONS

Azubel, M., et al., "Electron Microscopy of Gold Nanoparticles at Atomic Resolution," Science, Aug. 22, 2014, vol. 345, pp. 909-912.

(Continued)

*Primary Examiner* — Ishrat I Sherali
(74) *Attorney, Agent, or Firm* — Patent Portfolio Builders PLLC

(57) ABSTRACT

A system and method involve receiving a sequence of images of an object with at least two consecutive images of the sequence being spatially shifted relative to each other. Each image is transformed into a Fourier domain using a Fourier transform to generate a corresponding plurality of Fourier transformed images. An amplitude filtered pattern is calculated in the Fourier domain based on amplitude components of the plurality of Fourier transformed images. Spatial shifts for pairs of consecutive images in the sequence of images are determined using the amplitude filtered pattern. Images in the sequence of images are aligned based on the determined spatial shifts and the aligned images are summed to form an image-shift-corrected summed image.

20 Claims, 10 Drawing Sheets

(56) References Cited

U.S. PATENT DOCUMENTS

2016/0305883 A1* 10/2016 Betzig .................... G02B 21/16
2017/0309441 A1 10/2017 Flanagan

OTHER PUBLICATIONS

Brivio, F., et al., "Relativistic Quasiparticle Self-Consistent Electronic Structure of Hybrid Halide Perovskite Photovoltaic Absorbers," Physical Review, Apr. 21, 2014, vol. B 89, pp. 155204-1-155204-6.
Cavka, J.H., et al., "A New Zirconium Inorganic Building Brick Forming Metal Organic Frameworks With Exceptional Stability," Journal of the American Chemical Society, Sep. 26, 2008, vol. 130, pp. 13850-13851.
Chui, S.S., et al., "A Chemically Functionalizable Nanoporous Material [Cu3(TMA)2(H2O)3]n," Science, Feb. 19, 1999, vol. 283, pp. 1148-1150.
Cravillon, J., et al., "Rapid Room-Temperature Synthesis and Characterization of Nanocrystals of a Prototypical Zeolitic Imidazolate Framework," Chemistry of Materials, Mar. 26, 2009, vol. 21, pp. 1410-1412.
Duden, T., et al., "KSpaceNavigator as a Tool for Computer-Assisted Sample Tilting in High-Resolution Imaging, Tomography and Defect Analysis," Ultramicroscopy, Aug. 24, 2011, vol. 111, pp. 1574-1580.
Egerton, R.F., "Mechanisms of Radiation Damage in Beam-Sensitive Specimens, for TEM Accelerating Voltages Between 10 and 300 kV," Microscopy Research and Technique, Jul. 17, 2012, No. 75, pp. 1550-1556.
Farha, O.K., et al., "De Novo Synthesis of a Metal-Organic Framework Material Featuring Ultrahigh Surface Area and Gas Storage Capacities," Nature Chemistry, Nov. 2010, vol. 2, pp. 944-948.
Furukawa, H., et al., "The Chemistry and Applications of Metal-Organic Frameworks," Science, Aug. 30, 2013, vol. 341, pp. 1230444-1-1230444-12.
Garcia, A., et al., "Analysis of Electron Beam Damage of Exfoliated MoS(2) Sheets and Quantitative HAADF-STEM Imaging," Ultramicroscopy, Jun. 2, 2014, vol. 146, pp. 33-38.
Guan, L.H., et al., "Smallest Carbon Nanotube Assigned With Atomic Resolution Accuracy," Nano Letters, Jan. 11, 2008, vol. 8, pp. 459-462.
Hashimoto, K., et al., "Direct Evidence for Atomic Defects in Graphene Layers," Nature, Aug. 19, 2004, vol. 430, pp. 870-873.
Jia, C.L., et al. "Atomic-Resolution Imaging of Oxygen in Perovskite Ceramics," Science, Feb. 7, 2003, vol. 299, pp. 870-873.
Jin, L., et al., "Applications of Direct Detection Device in Transmission Electron Microscopy," Journal of Structural Biology, Oct. 26, 2007, vol. 161, pp. 352-358.
Kilaas, R., "Optimal and Near-Optimal Filters in High-Resolution Electron Microscopy," Journal of Microscopy, Apr./May 1998, vol. 190, Parts ½, pp. 45-51.
Lebedev, O.I., et al., "First Direct Imaging of Giant Pores of the Metal-Organic Framework MIL-101," Chemistry of Materials, Dec. 1, 2005, vol. 17, pp. 6525-6527.
Li, H., et al. "Design and Synthesis of an Exceptionally Stable and Highly Porous Metal-Organic Framework," Nature, Nov. 18, 1999, vol. 402, pp. 276-279.
Li, X.M., et al., "Electron Counting and Beam-Induced Motion Correction Enable Near-Atomic-Resolution Single-Particle Cryo-EM," Nature Methods, Jun. 2013, vol. 10, pp. 584-590.
Liu, X., et al., "Isomorphous Incorporation of Tin Ions into Germanosilicate Framework Assisted by Local Structural Rearrangement," ACS Catalysis, Nov. 11, 2016, vol. 6, pp. 8420-8431.
Martin, J.D., et al., "Designing Intermediate-Range Order in Amorphous Materials." Nature, Sep. 2002, vol. 119, pp. 381-384.
Merk, A., et al., "Breaking Cryo-EM Resolution Barriers to Facilitate Drug Discovery," Cell, Jun. 16, 2016, vol. 165, pp. 1698-1707.
Meyer, J.C., et al., "Experimental Analysis of Charge Redistribution Due to Chemical Bonding by High-Resolution Transmission Electron Microscopy," Nature Materials, Mar. 2011, vol. 10, pp. 209-215.
Mitchell, D.R.G., HRTEM filter V1.3 (https://www.felmi-zfe.at/dm-script/dm-script-database/), downloaded from the Internet Mar. 18, 2018.
Park, K.S., et al., "Exceptional Chemical and Thermal Stability of Zeolitic Imidazolate Frameworks," Proceedings of the National Academy of Sciences of the United States of America, Jul. 5, 2005, vol. 103, pp. 10186-10191.
QSTEM V2.31 (http://www.qstem.org), last modified Oct. 19, 2017, downloaded from the internet Mar. 18, 2018.
Roth, W.J., et al., "A Family of Zeolites With Controlled Pore Size Prepared Using a Top-Down Method," Nature Chemistry, Jul. 2013, vol. 5, pp. 628-633.
Sichert, J.A., et al., "Quantum Size Effect in Organometal Halide Perovskite Nanoplatelets," Nano Letters, Sep. 1, 2015, vol. 15, pp. 6521-6527.
Sidorov, M.V., ctfExplorer V0.999a (http://www.maxsidorov.com/ctfexplorer), created May 21, 2000, last updated Apr. 19, 2017, downloaded from the internet Mar. 18, 2018.
Snaith, H.J., et al., "Anomalous Hysteresis in Perovskite Solar Cells," The Journal of Physical Chemistry Letters, Mar. 24, 2014, vol. 5, pp. 1511-1515.
Susi, T., et al., "Atomistic Description of Electron Beam Damage in Nitrogen-Doped Graphene and Single-Walled Carbon Nanotubes," ACS Nano, Sep. 24, 2012, vol. 6, No. 10, pp. 8837-8846.
Torad, N.L., et al., "Facile Synthesis of Nanoporous Carbons With Controlled Particle Sizes by Direct Carbonization of Monodispersed ZIF-8 Crystals," The Royal Society of Chemistry, Feb. 4, 2013, vol. 49, pp. 2521-2523.
Tress, W., et al., "Understanding the Rate-Dependent J-V Hysteresis, Slow Time Component, and Aging in CH3NH3PbI3 Perovskite Solar Cells: The Role of a Compensated Electric Field," Energy & Environmental Science, Jan. 5, 2015, vol. 8, pp. 995-1004.
Ugurlu, O., et al., "Radiolysis to Knock-on Damage Transition in Zeolites Under Electron Beam Irradiation," Physical Review, 2011, vol. B 83, pp. 113408-1-113408-4.
Valenzano, L., et al., "Disclosing the Complex Structure of UiO-66 Metal Organic Framework: A Synergic Combination of Experiment and Theory," Chemistry of Materials, Mar. 4, 2011, vol. 23, pp. 1700-1718.
Van De Walle, A., "A Complete Representation of Structure-Property Relationships in Crystals," Nature Materials, Jun. 2008, vol. 7, pp. 455-458.
Wan, W., et al., "Structure Projection Reconstruction From Through-Focus Series of High-Resolution Transmission Electron Microscopy Images," Ultramicroscopy, Jan. 31, 2012, vol. 115, pp. 50-60.
Wan, W., et al., "Three-Dimensional Rotation Electron Diffraction: Software RED for Automated Data Collection and Data Processing," Journal of Applied Crystallography, Oct. 9, 2013, vol. 46, pp. 1863-1873.
Wang, F.L., et al., "The Controlled Regulation of Morphology and Size of HKUST-1 by "Coordination Modulation Method"," Microporous and Mesoporous Materials, Feb. 26, 2013, vol. 173, pp. 181-188.
Wei, J., et al., "Hysteresis Analysis Based on the Ferroelectric Effect in Hybrid Perovskite Solar Cells," The Journal of Physical Chemistry Letters, Oct. 24, 2014, vol. 5, pp. 3937-3945.
Wei, Y.J., et al., "The Nature of Strength Enhancement and Weakening by Pentagon-Heptagon Defects in Graphene," Materials, Sep. 2012, vol. 11, pp. 759-763.
Wiktor, C., et al., "Imaging of Intact MOF-5 Nanocrystals By Advanced TEM at Liquid Nitrogen Temperature," Microporous and Mesoporous Materials, Jun. 16, 2012, vol. 162, pp. 131-135.
Xu, Z.D., et al., "Pt@UiO-66 Heterostructures for Highly Selective Detection of Hydrogen Peroxide with an Extended Linear Range," Analytical Chemistry, Feb. 20, 2015, vol. 87, pp. 3438-3111.
Zaefferer, S., "New Developments of Computer-Aided Crystallographic Analysis in Transmission Electron Microscopy," Journal of Applied Crystallography, Feb. 2000, vol. 33, pp. 10-25 (Statement

(56) References Cited

OTHER PUBLICATIONS of Relevancy: There was a commercial program from TSL in the 90s called "TOCA" as part of a software package "ACT" where similar aalculation/estimation of Laure circle was performed. A search for this program resulted in the attached paper.).

Zandbergen, H.W., et al., "The Use of Through Focus Exit Wave Reconstruction in the Structure Determination of Several Intermetallic Superconductors," Ultramicroscopy, Aug. 1996, vol. 64, pp. 231-247.

Zhu, L.K., et al., "Direct Observations of the MOF (UiO-66) Structure by Transmission Electron Microscopy," The Royal Society of Chemistry, Aug. 19, 2013, vol. 15, pp. 9356-9359.

Zhu, Y., "Unravelling Surface and Interfacial Structures of a Metal-Organic Framework by Transmission Electron Microscopy," Nature Materials, Feb. 20, 2017, vol. 16, pp. 532-536.

Zhu, Y.H., et al., "Atomic Resolution Imaging of Nanoscale Structural Ordering in a Complex Metal Oxide Catalyst," Chemistry of Materials, Jul. 28, 2012, vol. 24, pp. 3269-3278.

Zhu, Y.H., et al., "Chiral Gold Nanowires with Boerdijk-Coxeter-Bemal Structure," Journal of the American Chemical Society, Aug. 15, 2014, vol. 136, pp. 12746-12752.

Zhu, Y.H., et al., "Direct Observation of Surface Reconstruction and Termination on a Complex Metal Oxide Catalyst by Electron Microscopy," Angewandte Chemie International, Mar. 19, 2012, Edit 51, pp. 4176-4180.

Zou, X.D., et al., "Electron Crystallography: Electron Microscopy and Electron Diffraction," Oxford University Press, 2011, pp. 177-190.

Jansen, J., et al.; "Towards automatic alignment of a crystalline sample in an electron microscope along a zone axis"; Ultramicroscopy, vol. 125, XP055473754; Nov. 5, 2012; pp. 59-65.

Zhang, D., et al.; "Atomic-resolution transmission electron microscopy of electron beam-sensitive crystalline materials"; Science, vol. 359, No. 6376; XP055473443; Jan. 18, 2018; pp. 675-679.

Zhang, D., et al.; "Supplementary Materials for Atomic-resolution transmission electron microscopy of electron beam-sensitive crystalline materials"; Science; XP055474073; Jan. 18, 2018; pp. 1-26.

Invitation to Pay Additional Fees and, Where Applicable, Protest Fee, dated May 22, 2018, in International Application No. PCT/IB2018/050910. (All references not cited herewith have been previously made of record.).

\* cited by examiner

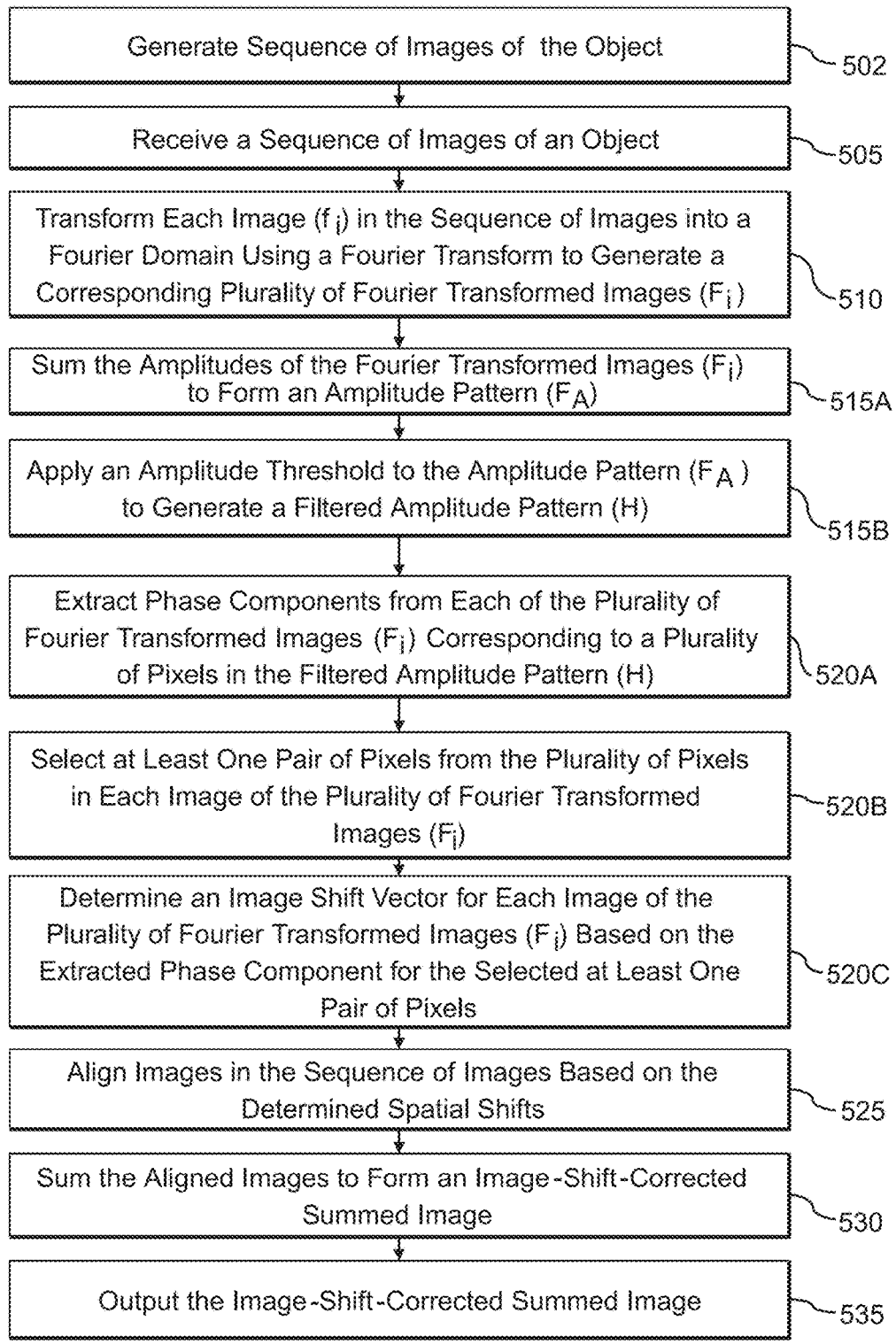

IMAGE SERIES ALIGNMENT SYSTEM AND METHOD

BACKGROUND

Technical Field

Embodiments of the subject matter disclosed herein generally relate to systems and methods for aligning a time series of images of an object.

Discussion of the Background

One type of device that uses an electron beam for imaging an object is a transmission electron microscope (TEM). TEMs are commonly used for high resolution transmission electron microscopy (HRTEM) to image crystalline solids consisting of periodically arranged atoms. An HRTEM study of an object, such as crystalline solids, typically involves taking a time series sequence of images of the object, each image being subject to a very short exposure time. Some objects imaged as part of an HRTEM study, such as crystalline solids, are sensitive to and can be damaged by the electron beam, and thus the amount of electron radiation applied to the object during each imaging time period can be very low. Some materials can be damaged by a cumulative electron dose of less than 10 electrons per $Å^2$ and many materials can be damaged by cumulative doses the range of 10-20 $e$-$Å^{-2}$. The types of damage include knock-on damage, heating damage, and radiolysis. Although knock-on damage can be addressed using low accelerating voltages (e.g., 60-120 kV), the use of low-energy electrons results in poor image resolution and short penetration depth.

Applying a low amount of electron radiation using a short exposure results in each individual image in the sequence of images being very noisy, so much so that it is often difficult to observe the object in any single image. Because the noise is random, it is common in HRTEM studies to sum the sequence of images to improve the overall signal-to-noise ratio of the image being examined.

It is quite common, and typically unavoidable, that the object moves or drifts during the imaging sequence, and thus the object will appear in different locations in different images in the sequence of images. Image alignment is typically employed to address these planar shifts so that the object is in a common location within the set of images when the images are combined. Common alignment techniques include phase-correlation and feature matching. Further, due to the low signal-to-noise ratio, frequency filters, including low-, high-, and band-pass filters, are often also applied to the images in the sequence of images in the Fourier domain and then the images are transferred back to their original domain for combining. Although these techniques can improve some images, the techniques do not adequately address the low signal-to-noise ratio in images of electron-beam sensitive materials that are imaged using very short exposure times and low doses of electron beam radiation.

Thus, there is a need for systems and methods that align a series of images of an object taken using very short exposure times and low doses of electron beam radiation so that the individual images can be aligned and summed for further study.

SUMMARY

According to an embodiment, there is a method involving receiving a sequence of images of an object with at least two consecutive images of the sequence being spatially shifted relative to each other. Each image is transformed into a Fourier domain using a Fourier transform to generate a corresponding plurality of Fourier transformed images. An amplitude filtered pattern is calculated in the Fourier domain based on amplitude components of the plurality of Fourier transformed images. Spatial shifts for pairs of consecutive images in the sequence of images are determined using the amplitude filtered pattern. Images in the sequence of images are aligned based on the determined spatial shifts and the aligned images are summed to form an image-shift-corrected summed image.

According to another embodiment, there is a system, which includes a memory storing processor instructions and a processor coupled to the memory. The processor is configured to execute the processor instructions stored in memory, which causes the processor to receive a sequence of images of an object, wherein at least two consecutive images of the sequence of images are spatially shifted relative to each other; transform each image in the sequence of images into a Fourier domain using a Fourier transform to generate a corresponding plurality of Fourier transformed images; calculate an amplitude filtered pattern in the Fourier domain based on amplitude components of the plurality of Fourier transformed images; determine spatial shifts for pairs of consecutive images in the sequence of images using the amplitude filtered pattern; align images in the sequence of images based on the determined spatial shifts; and sum the aligned images to form an image-shift-corrected summed image.

According to yet another embodiment, there is a method involving calculating, by a processor, an amplitude filtered pattern in a Fourier domain based on amplitude components of a plurality of Fourier transformed images of a sequence of images. The processor replaces an amplitude component of the plurality of Fourier transformed images with the amplitude pattern to form a plurality of filtered Fourier transformed images. The processor performs an inverse Fourier transform on the plurality of filtered Fourier transformed images to form a corresponding plurality of reverse transformed, filtered images. The processor determines image shift information using the plurality of reverse transformed, filtered images. The processor applies the image shift information to images in the sequence of images to form a plurality of aligned images.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 5A and 5B illustrate flowcharts of a method for aligning a time series of images according to an embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of high resolution transmission electron microscopy (HRTEM). However, the embodiments to be discussed next are not limited to HRTEM but may be applied to any type of image analysis requiring alignment of a series of images having relatively high signal-to-noise ratios, including image analysis for other types of microscopy, medical imaging, and computer vision.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment a sequence of images of an object are received in which at least two consecutive images of the sequence of images are spatially shifted relative to each other. Each image in the sequence of images is transformed into a Fourier domain using a Fourier transform to generate a corresponding plurality of Fourier transformed images. An amplitude filtered pattern is calculated in the Fourier domain based on amplitude components of the plurality of Fourier transformed images. Spatial shifts for pairs of consecutive images in the sequence of images are determined using the amplitude filtered pattern. Images in the sequence of images are aligned based on the determined spatial shifts and the aligned images are summed to form an image-shift-corrected summed image.

Figure 1:
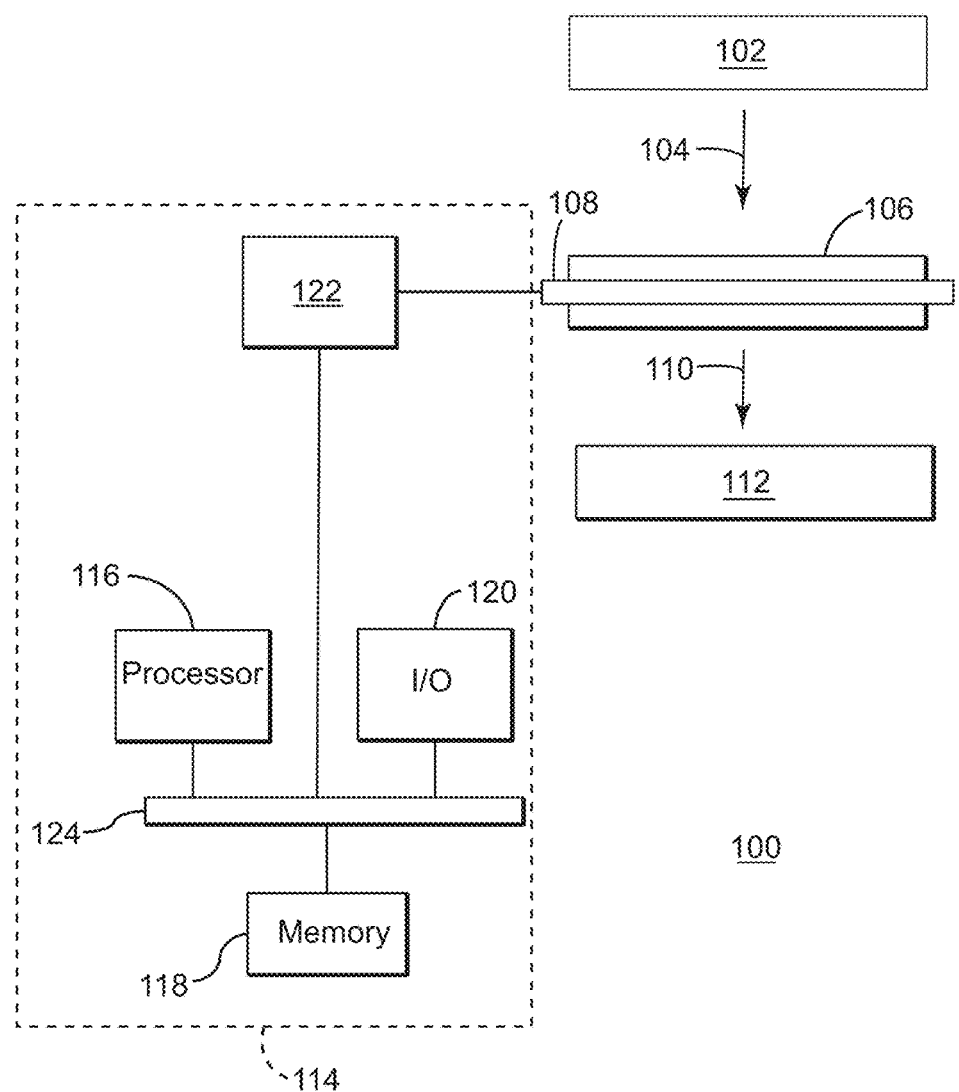
FIG. 1 is a schematic diagram of a system for aligning a time series of images according to an embodiment.

FIG. 1 is a schematic diagram of a TEM according to an embodiment. The system 100 includes an electron gun 102 that applies an electron beam 104 to an object 106, which can be a sample being studied, which is situated in a holder 108. A beam of electrons 110 passing through the sample 106 is received by an imaging detector 112, which can be film or a digital pixel detector, such as a direct-detection electron-counting (DDEC) camera (e.g., a Gatan K2 Summit) or a charge coupled device (CCD) camera. DDEC cameras are particularly useful due to the high detective quantum efficiency (DQE) that allows ultra-low electron doses. For example, a DDEC camera allows image acquisition at magnifications of at least 55,000 to achieve atomic resolution (i.e., a pixel size of 0.57 Å×0.57 Å) with an electron beam dose as lows as 2-4 e⁻ per pixel (i.e., doses as low as 6-12 e-Å$^{-2}$). Those skilled in the art will recognize an imaging detector represents a class of structures for obtaining an image of the sample 106.

The system 100 also has a control system 114, which includes a processor 116, memory 118, input/output interface 120, and sample holder positioning controller 122, which can communicate with one another via bus 124. The input/output interface 120 allows an operator to communicate with the processor 116, memory 118, and/or the positioning controller 122 to operate the TEM. For example, the input/output interface 120 can include one or more displays for displaying samples imaged by imaging detector 112, as well as one or more input devices for manually controlling various aspects of the TEM (e.g., focus, sample positioning, etc.), and for initiating the image series alignment disclosed in more detail below.

Those skilled in the art will recognize that the positioning controller 122 refers to a class of structures used by a TEM for controlling the orientation of sample. Although not illustrated for purposes of clarity, processor 116 is also communicatively via bus 124 coupled to electron gun 102 and imaging detector 112 to provide instructions to control these devices and receive outputs from these devices.

For ease of explanation some of the components of a TEM are not illustrated, however these additional components are not necessary for understanding the disclosed embodiments.

The disclosed image series alignment can be performed using processor instructions stored in memory 118 and executed by processor 116 using a sequence of images obtained from imaging detector 112. Thus, these processor instructions can be loaded into a TEM to perform the methods discussed below. Alternatively, the image series alignment can be performed by a processor external to the TEM, in which case the series of images are provided by the system 100 to the external processor via input/output interface 120. The external processor can be in the same location as the TEM or can be situated at a different, remote location. Accordingly, the references to processor 116 should be understood as including referring to either of an internal and external processor.

Figure 2:
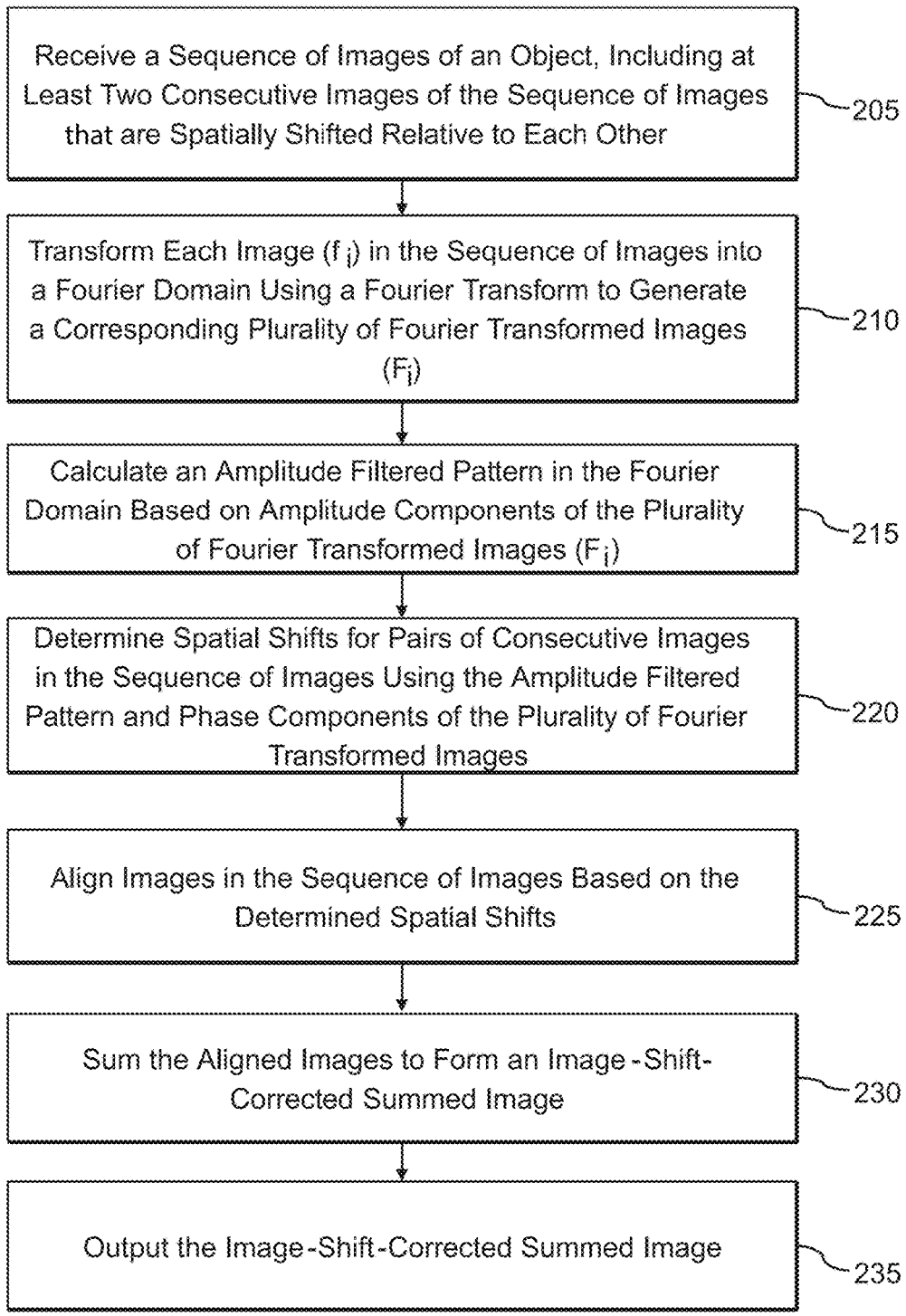
FIG. 2 illustrates a flowchart of a method for aligning a time series of images according to an embodiment.

FIG. 2 illustrates a flowchart of a method for aligning a time series of images according to an embodiment. Initially, the processor 116 receives a sequence of images of an object from imaging detector 112 (step 205). As discussed above, there is inevitably some movement or drift during the imaging sequence, and accordingly at least two consecutive images of the sequence of images are spatially shifted relative to each other, i.e., shifted in the plane in which the holder 108 extends. The processor 116 transforms each image ($f_i$) in the sequence of images ($f_1(x,y)$, $f_2(x,y)$, ..., $f_n(x,y)$) into a Fourier domain using a Fourier transform to generate a corresponding plurality of Fourier transformed images ($F_i$) (step 210).

The processor 116 then calculates an amplitude filtered pattern (H) in the Fourier domain based on amplitude components of the plurality of Fourier transformed images ($F_i$) (step 215). The amplitude filtered pattern including pixels having amplitudes at or above the amplitude threshold and omits pixels having amplitude components below the threshold. Spatial shifts for pairs of consecutive images in the sequence of images are determined using amplitude filtered pattern and phase components of the plurality of Fourier transformed images ($F_i$) (step 220). The amplitude filter filters pixels based on amplitude, which contrasts with conventional techniques employing frequency filters. The processor 116 then aligns images in the sequence of images based on the determined spatial shifts (step 225) and sums the aligned images to form an image-shift-corrected summed image (step 230). The image-shift-corrected summed image can then be output, for example on a display via input/output interface 120 (step 235).

Further details of some of the steps described in connection with FIG. 2 will now be provided in connection with the description of the remaining figures.

Figure 3:
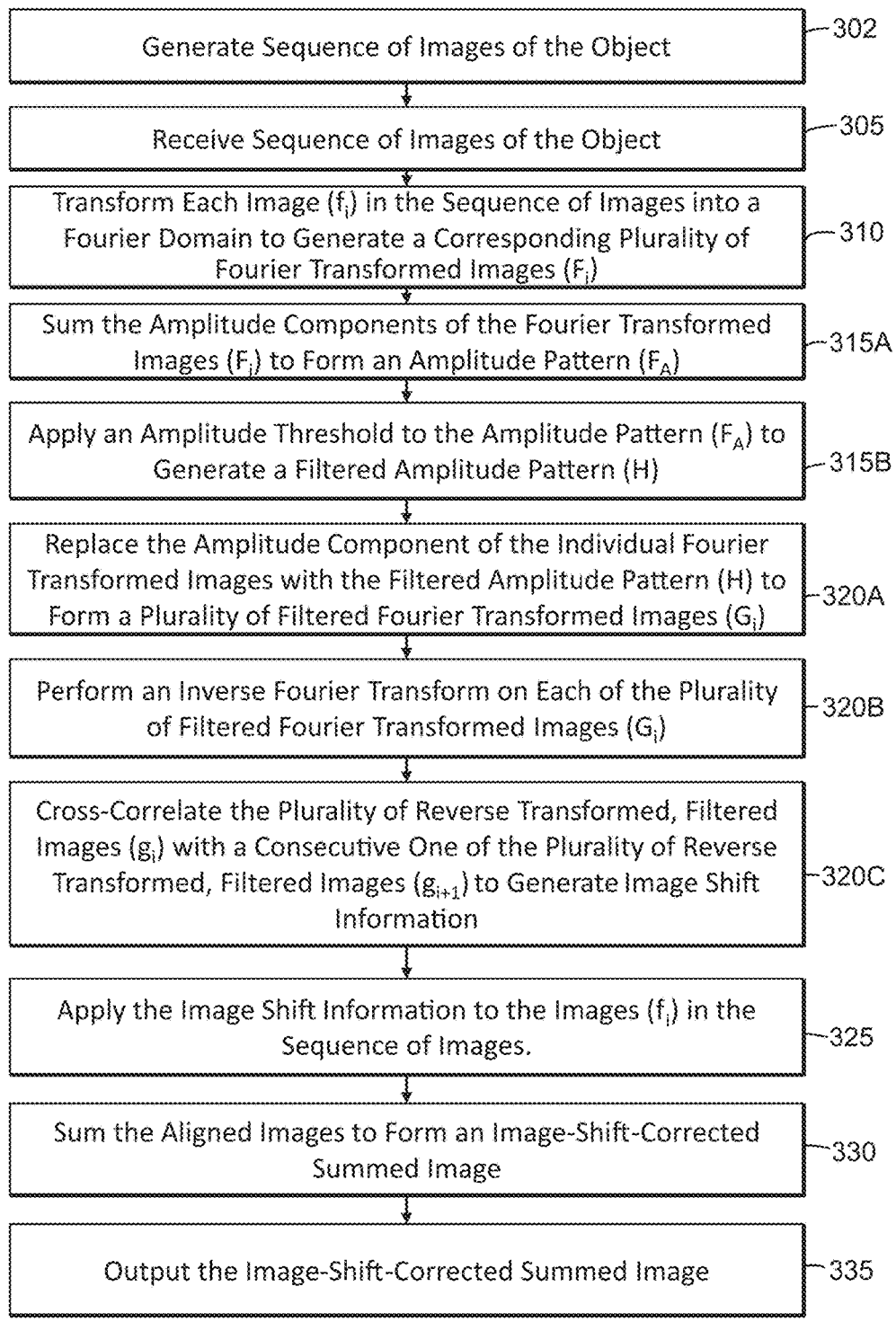
FIG. 3 illustrates a flowchart of a method for aligning a time series of images according to an embodiment.
Figure 4A:
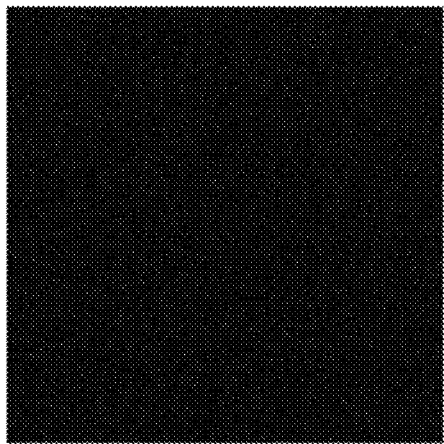
FIGS. 4A-4D, 4F, and 4G are images of an object used for aligning a time series of images according to an embodiment.

FIG. 3 illustrates a flowchart of a method for aligning a time series of images according to an embodiment. This flowchart provides additional details of the steps in the flowchart of FIG. 2 according to an embodiment. Initially, the processor 116 controls the electron gun 102 and imaging detector 112 to generate a sequence of images of the object by applying an electron beam to the object for a plurality of distinct time periods (step 302). FIG. 4A is an example of one individual image from the sequence of images, which shows the individual image is very noisy and the contrast is close to noise level, which can be due to the very short exposure time for capturing the individual image and/or the low electron dose applied to generate the image. The plurality of distinct time periods corresponds to a number of images in the sequence of images.

The image in FIG. 4A and all other example images illustrated in the figures were captured using a Titan Image Cs corrected Cube Transmission Electron Microscope (FEI) equipped with a K2-IS CMOS camera (manufactured by Gatan, Inc.), with 0.05 s exposure per image, 120 images in total, and a mean count of approximately 0.013 e/pixel in each individual image. The object imaged is a UiO-66 nano-sized Metal Organic Framework (MOF) crystal. In contrast, conventional techniques require a dose greater than 0.67e⁻ per pixel per frame to attain sufficient a signal-to-noise ratio for reliable alignment.

The processor 116 receives a sequence of images ($f_1(x,y)$, $f_2(x,y)$, ..., $f_n(x,y)$) of an object from imaging detector 112 (step 305), which as discussed above includes at least two consecutive images of the sequence of images spatially shifted relative to each other. The processor 116 then transforms each image ($f_i$) in the sequence of images ($f_1(x,y)$, $f_2(x,y)$, ..., $f_n(x,y)$) into a Fourier domain using a Fourier transform to generate a corresponding plurality of Fourier transformed images ($F_i$) (step 310). For a sequence of images containing i images ($f_1(x,y)$, $f_2(x,y)$, ..., $f_n(x,y)$), the Fourier transform of one individual image ($f_i(x,y)$) is:

$$F_i(u,v) = \iint f_i(x,y) e^{-2\pi i(ux+vy)} dx dy \quad (1)$$

The equation in polar form is as follows:

$$F_i(u,v) = |F_i(u,v)| e^{-i\phi(u,v)} \quad (2)$$

where $|F_i(u,v)|$ is the amplitude and $\phi(u,v)$ is the phase of $F_i(u,v)$.

The processor 116 calculates an amplitude filtered pattern in the Fourier domain by summing the amplitude components of the Fourier transformed images ($F_i$) to form an amplitude pattern ($F_A$) (step 315A) and then applying an amplitude threshold to the amplitude pattern ($F_A$) to generate an amplitude filtered pattern (H) (step 315B). The amplitude filtered pattern (H) includes pixels in the amplitude pattern ($F_A$) having an amplitude at or above the amplitude threshold. Specifically, the Fourier transform amplitude components from all of the images in the sequence of images forms the amplitude pattern ($F_A$), which can be denoted as:

$$F_A(u,v) = \Sigma_{n=1}^{i} |F_i(u,v)| \quad (3)$$

In one non-limiting embodiment, the amplitude threshold $I_t$ can be a value in the following range:

$$I_t > 2 \times I_{mean} - I_{min} \quad (4)$$

Where $I_{mean}$ and $I_{min}$ are the mean value and the minimum value among all of the pixels in the amplitude pattern ($F_A$). Equation (4) describes one example of how to calculate the amplitude threshold $I_t$ and it should be recognized that there are many other ways to calculate the amplitude threshold $I_t$.

An amplitude filtered pattern can be represented by:

$$H(u,v) = \begin{cases} I_{uv} - I_t & \text{if } I_{uv} \geq I_t \\ 0 & \text{if } I_{uv} < I_t \end{cases} \quad (5)$$

where $I_{uv}$ is the intensity value at point (u,v) in the amplitude pattern $F_A(u,v)$. Equation (5) describes on example of how to calculate the amplitude filtered pattern H(u,v) and it should be recognized that there are many other ways to calculate the amplitude filtered pattern H(u,v). One of these alternatives could involve keeping the value $I_{uv}$ if $I_{uv} \geq I_t$ (instead of using the value $I_{uv} - I_t$).

Figure 4B:
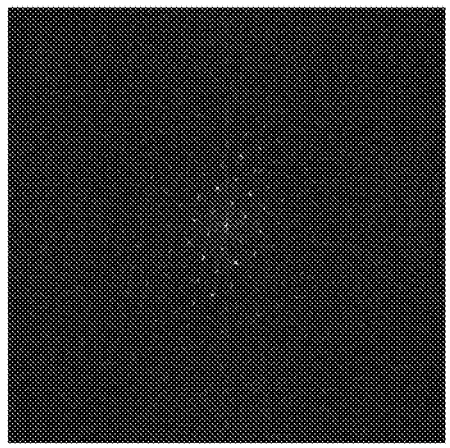
Figure 4C:
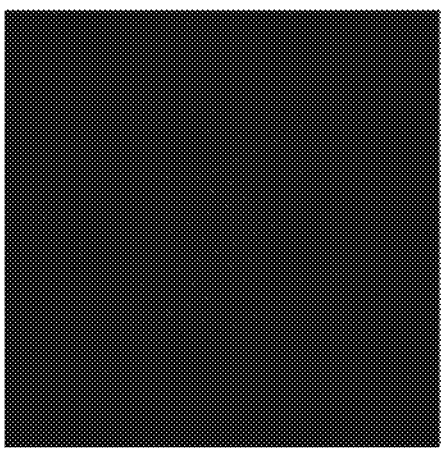

As illustrated in FIG. 4B, the amplitude pattern ($F_A$) reduces the signal-to-noise ratio so that the amplitude peaks corresponding to the atomic structure of the imaged object can be observed above the noise. The image in FIG. 4C is the amplitude filtered pattern H(u,v), which eliminates all pixels in the amplitude pattern having an amplitude value below the amplitude threshold of the amplitude filter while retaining the pixels having an amplitude value above the amplitude threshold of the amplitude filter. The image in FIG. 4C was produced using an amplitude threshold that eliminates all pixels except those corresponding to approximately 100 pixels having the highest amplitude in the Fourier transformed and summed image. Thus, for example, the amplitude threshold can be set to result in a predetermined number of pixels in the amplitude filtered pattern (H).

Next, the processor 116 replaces the amplitude component $|F_i(u,v)|$ of the individual Fourier transformed images $F_i(u,v)$ with the amplitude filtered pattern H(u,v) to form a plurality of filtered Fourier transformed images ($G_i$) (step 320A), which can be represented by the following equation:

$$G_i(u,v) = H(u,v) e^{-i\phi(u,v)} \quad (6)$$

The processor 116 then performs an inverse Fourier Transform on each of the plurality of filtered Fourier transformed images ($G_i$) to generate a corresponding plurality of reverse transformed, filtered images ($g_i$), (step 320B). Specifically, each filtered image $g_i(x,y)$ is represented by:

$$g_i(x,y) = \iint G_i(u,v) e^{2\pi i(ux+vy)} du dv \quad (7)$$

Figure 4D:
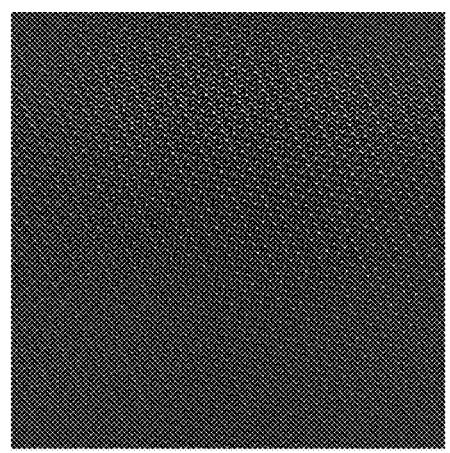

FIG. 4D illustrates an example of the image in FIG. 4A after having the amplitude component replaced by the amplitude filtered pattern (H) and then transformed back into the original domain. As can be observed, the lattice features of the imaged object become visible, whereas those features are not visible in the original, individual image illustrated in FIG. 4A.

The processor 116 then cross-correlates the plurality of reverse transformed, filtered images ($g_i$) with a consecutive one of the plurality of reverse transformed, filtered images ($g_{i+1}$) to generate image shift information for each of the plurality of reverse transformed, filtered images ($g_i$). (step 320C). Thus, no image shift information is calculated for the first image ($g_i$) and image shift information for each subsequent image ($g_{i+1}$) is based on the previous image in the sequence (i.e., $g_i$ for the second image and $g_{i-1}$ for each image after the second image). A fixed image is not used for the cross-correlation because the filtered image $g_i(x,y)$ contains a periodic lattice, and thus the determination of drifts only works for motions within a periodic unit. The use of consecutive images for cross-correlation addresses this issue because the drift between two consecutive images is unlikely to exceed the unit cell length.

Figure 4E:
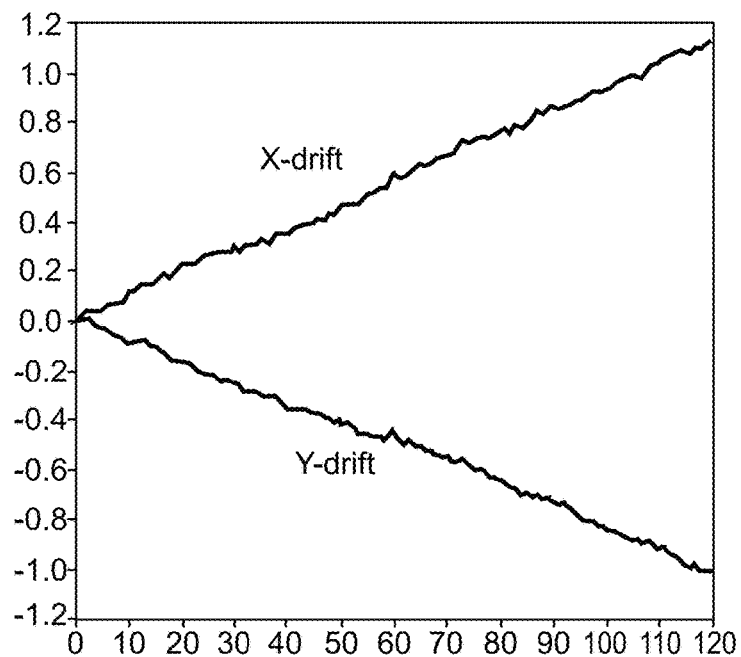
FIG. 4E illustrates a graph of drift plots across the X- and Y-axes for a sequence of images according to an embodiment.

FIG. 4E is a graph of an example of drift plots calculated from the cross-correlation, which shows the amount of drift in the X- and Y-axes for each image in the sequence relative to the previous image. Although these example drift plots are relatively linear, this may not occur in all implementations and the drift plots can take any form, depending upon the movement of the object during imaging, including one with appearing to contain random shifts.

The processor 116 then aligns the original images ($f_i$) in the sequence of images ($f_1(x,y)$, $f_2(x,y)$, . . . , ($f_n(x,y)$) by applying the image shift information to each original image ($f_i$) in the sequence of images (step 325). Thus, a single iteration cycle of the cross-correlation includes a drift determination operation and a drift correction operation of all of the images in the sequence of images. Assuming that the drift correction determination includes m cycles and that the drift determined for image i (relative to image 1) at iterative cycle k is $r_{ik}=[\Delta x_{ik}, \Delta y_{ik}]$, the overall drift for image i, $r_i$ relative to image 1 is:

$$r_i = \Sigma_{k=1}^{m} [\Delta x_{ik}, \Delta y_{ik}] \quad (8)$$

Thus, the overall alignment can be improved by performing a number of iterative cycles. In one embodiment, the number of iterative cycles is, for example, ten cycles.

Figure 4F:
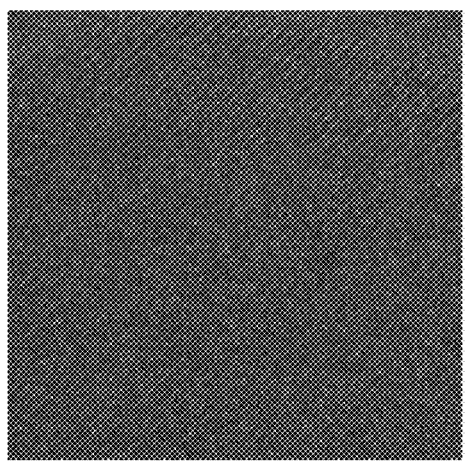
Figure 4G:
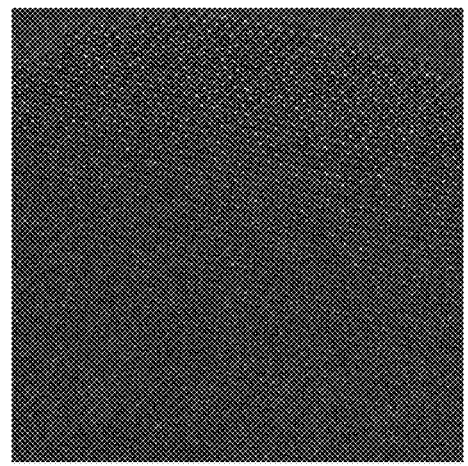

The processor 116 then sums the aligned images to form an image-shift-corrected summed image (step 330). The image-shift-corrected summed image can then be output, for example on a display via input/output interface 120 (step 335). FIG. 4F illustrates a summed image generated without performing any alignment of the images in the sequence of images and FIG. 4G illustrates summed images aligned in the manner described in connection with FIG. 3. As will be appreciated, the lattice features are much clearer in the summed images of FIG. 4G compared to that of FIG. 4F.

Figure 5B:
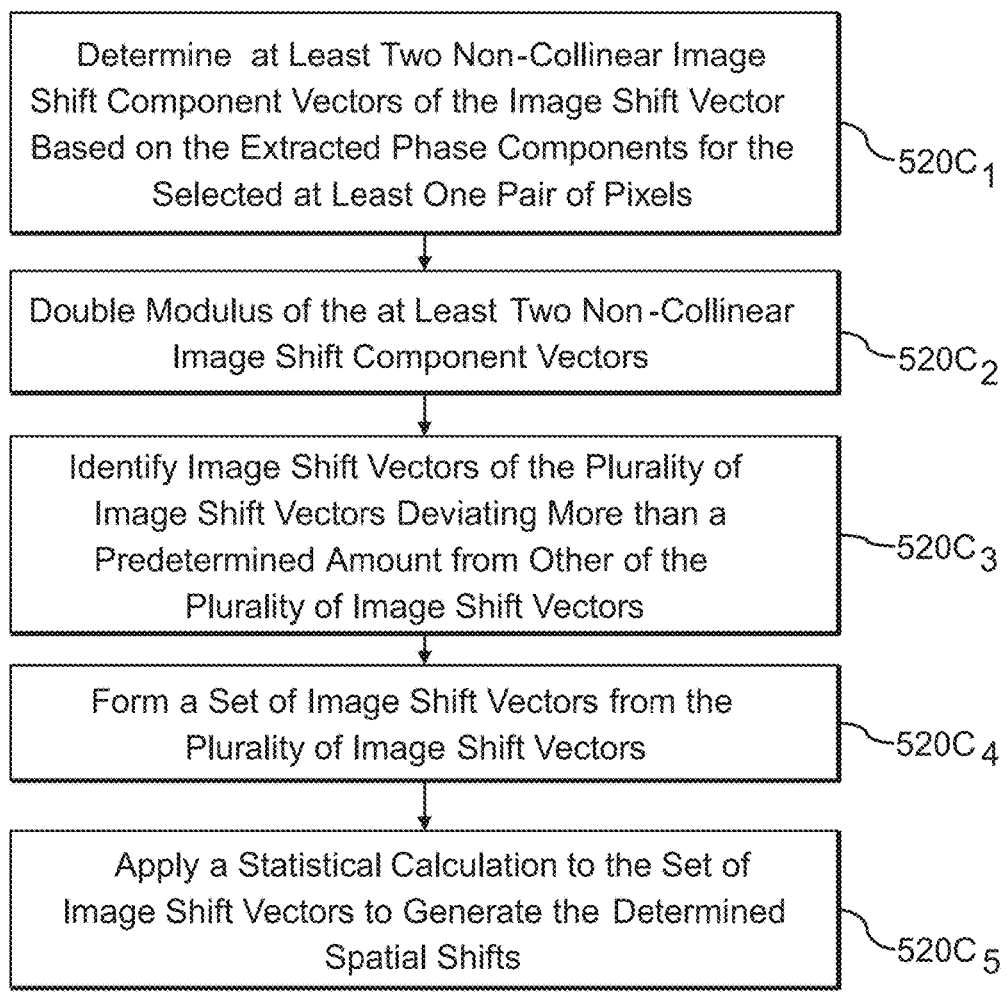

FIGS. 5A and 5B illustrate flowcharts of methods for aligning a time series of images according to an embodiment, which provide additional details of the method of FIG. 2. This embodiment employs an amplitude filter and a phase-based image alignment technique in which the phase components of certain pixels in each image in the Fourier domain are used for aligning the images in the image sequences.

A Fourier transform decomposes an image into components of different spatial frequencies that make it up and produces a complex-valued function of spatial frequencies, each having an amplitude component representing the amount of that frequency present in the original image and a phase offset component of the basic sinusoid in that frequency. An image containing periodic features that is transformed into the Fourier domain contains an array of peaks representing the periodical arrangements in real space. Planar shifts between images in the sequence of images do not affect the amplitude component but instead cause a change in the phase component corresponding to the planar shift between images.

Turning now to the details of the method of FIGS. 5A and 5B, similar to the discussion above in connection with the methods illustrated in FIGS. 2 and 3, the processor 116 controls the electron gun 102 and imaging detector 112 to generate a sequence of images ($f_1(x,y)$, $f_2(x,y)$, . . . , ($f_n(x,y)$) of the object by applying an electron beam to the object for a plurality of distinct time periods (step 502), receives a sequence of images ($f_1(x,y)$, $f_2(x,y)$, . . . , ($f_n(x,y)$) of an object from imaging detector 112 (step 505), and transforms each image ($f_i$) in the sequence of images into a Fourier domain using a Fourier transform to generate a corresponding plurality of Fourier transformed images ($F_i$) (step 510).

Figure 6A:
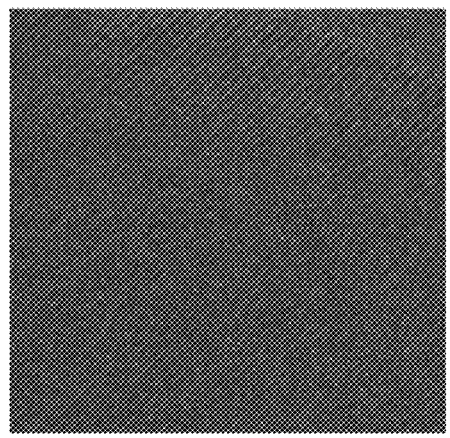
FIGS. 6A, 6B, and 6F are images of an object used for aligning a time series of images according to an embodiment.
Figure 6B:
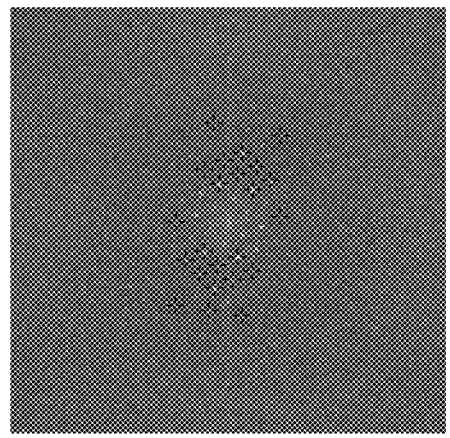

The processor 116 then calculates an amplitude filtered pattern by first summing the amplitudes of the Fourier transformed images ($F_i$) to form an amplitude pattern ($F_A$) (step 515A) and then applying an amplitude threshold to the amplitude pattern ($F_A$) to generate an amplitude filtered pattern (H) (step 515B). Like the discussion above, the amplitude filtered pattern includes pixels in the amplitude pattern ($F_A$) having an amplitude at or above the amplitude threshold, and thus in this embodiment identifies the pixels that are candidates for evaluation of phase changes in the Fourier transformed images ($F_i$). Because the noise level in the Fourier domain affects the accuracy of phase analysis, which is particularly critical when signal-to-noise ratio is low, the amplitude filtered pattern allows the subsequent phase analysis to be confined to the center of the peaks in Fourier domain where the signal-to-noise ratio is maximum. FIG. 6A is an image of the summed sequence of images without alignment and FIG. 6B is the amplitude pattern ($F_A$) that is the result of step 515A. As will be appreciated, the pixels of interest can be more easily observed above the noise in the summed images in FIG. 6B compared to those of FIG. 6A.

The processor 116 then determines the spatial shifts for the pairs of consecutive images by first extracting phase components from each of the plurality of Fourier transformed images ($F_i$) corresponding to a plurality of pixels in the filtered amplitude pattern (H) (step 520A). The plurality of pixels corresponds to a pixel in the filtered amplitude pattern (H) having an amplitude at or above the amplitude threshold. The processor 116 then selects at least one pair of pixels from the plurality of pixels in each image of the plurality of Fourier transformed images ($F_i$) (step 520B) and determines an image shift vector for each image of the plurality of Fourier transformed images ($F_i$) based on the extracted phase components for the selected at least one pair of pixels (step 520C).

Figure 6C:
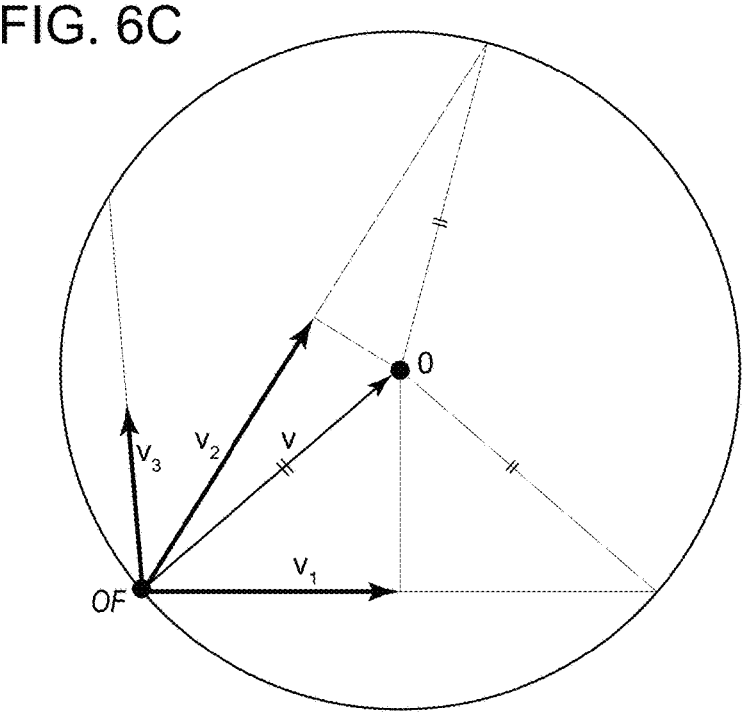
FIG. 6C illustrates an image shift circle according to an embodiment.

This embodiment employs an image shift circle, an example of which is illustrated in FIG. 6C, to determine the image shift vector and the method of employing the image shift circle in this manner is described in FIG. 5B. In FIG. 6C, $O_F$ is the center of the Fourier transformed image, O is the center of the image shift circle, v is the image shift vector, and $v_n$ are the shift vectors corresponding to selected pixels. Although the center of the image shift circle O and the image shift vector v are unknown at this point in the processing, the center of the Fourier transformed image $O_F$ is known, and accordingly only two more points on the circumference of the image shift circle are required to define the image shift circle, and in turn determine the image shift corresponding to the vector v from $O_F$ to O.

Accordingly, the processor 116 determines the image shift vector (step 520C) by first determining at least two non-collinear image shift component vectors of the image shift vector based on the extracted phase information for the selected at least one pair of pixels (step $520C_1$). The processor 116 then doubles the modulus of the at least two non-collinear image shift component vectors (step $520C_2$). Based on the doubled modulus, the processor 116 determines an image shift circle and the image shift vector corresponds to a radius of the image shift circle.

Although the method can be performed using just one pair of pixels, the accuracy of the shift determination can be increased by using multiple pairs of pixels, the details of which are illustrated in steps 520C$_3$-520C$_5$. Those skilled in the art will recognize the number of selected pixel pairs is a trade-off between increasing accuracy and increasing the load on the processor 116, which can increase the overall time required to perform the disclosed method. Accordingly, the processor 116 selects a plurality of pairs of pixels each image of the plurality of Fourier transformed images (F$_i$) and determines a plurality of image shift vectors for each of the plurality of pairs of selected pixels.

Figure 6D:
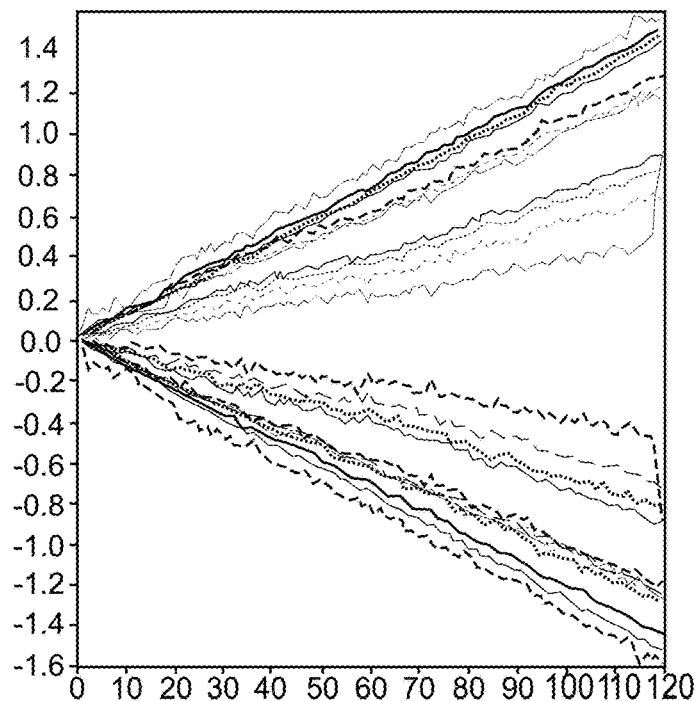
FIG. 6D illustrates the extracted phase plot from a sequence of images according to an embodiment.
Figure 6E:
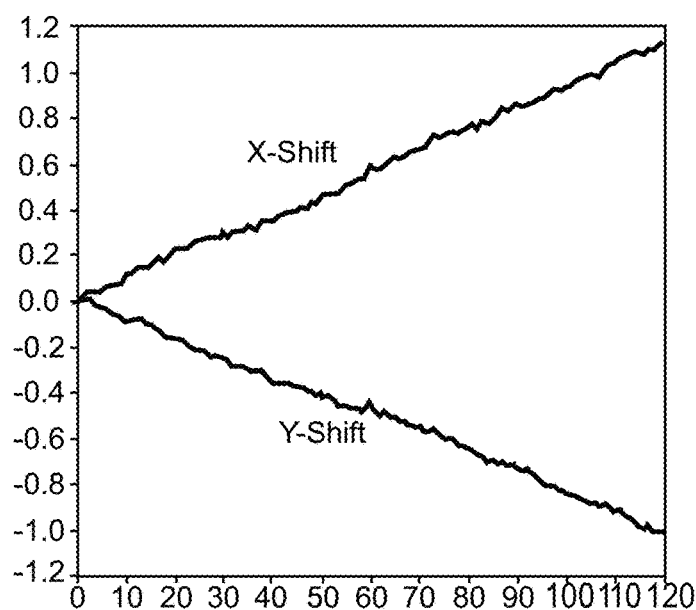
FIG. 6E illustrates a graph of drift plots across the X- and Y-axes for a sequence of images according to an embodiment.

Specifically, the processor 116 identifies image shift vectors of the plurality of image shift vectors deviating more than a predetermined amount from other of the plurality of image shift vectors (step 520C$_3$) and forms a set of image shift vectors from the plurality of image shift vectors (step 520C$_4$). The identified image shift vectors are considered outliers, and therefore are not included in the set of image shift vectors. Finally, the processor 116 applies a statistical calculation to the set of image shift vectors to generate the determined spatial shifts (step 520C$_5$). Any type of statistical calculation can be applied, including a mean, mode, median, etc. FIG. 6D illustrates the phases determined using more than two non-collinear image shift component vectors set of image shift vectors per image and FIG. 6E illustrates the final calculated phase shifts. Thus, in FIG. 6D there are multiple phase shifts calculated for each image, which are subjected to the statistical calculation to obtain the final phase shifts illustrated in FIG. 6E.

Figure 6F:
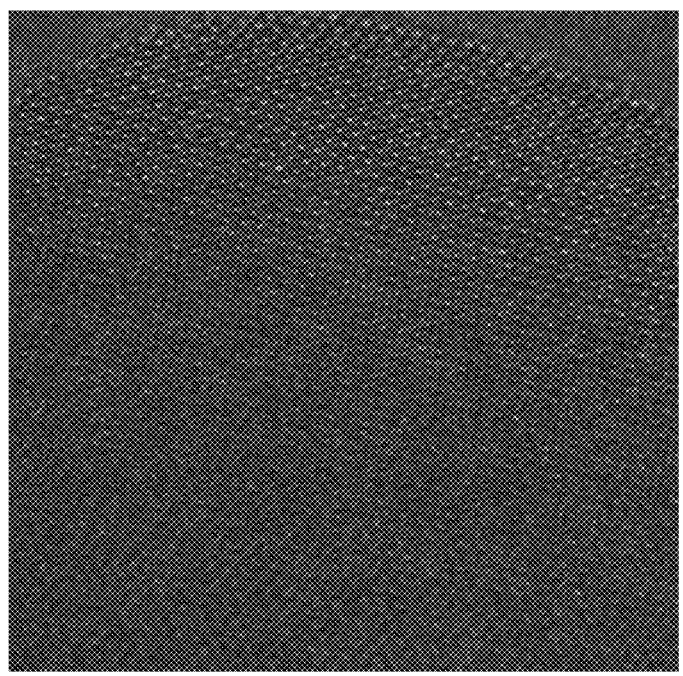

Returning to FIG. 5A, the processor 116 then aligns the images in the sequence of images based on the determined spatial shifts (step 525). Finally, the processor sums the aligned images to form an image-shift-corrected summed image (step 530). The image-shift-corrected summed image can then be output, for example on a display via input/output interface 120 (step 535). FIG. 6F illustrates an example of an image-shift-corrected summed image, which compared to the summed sequence of unaligned images in FIG. 6A shows the details of the crystallography of the object more distinguished from the image noise.

Although exemplary embodiments are described in connection with transmission electron microscopes (TEMs), high resolution transmission electron microscopy (HR-TEM), and the use of an electron beam to image an object, the present invention can also be used in connection with any image series of an object containing periodic features regardless of whether the image series was produced using a transmission electron microscope, high resolution transmission electron microscopy, and an electron beam.

The disclosed embodiments provide systems and methods for aligning a series of images. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, comprising:
    obtaining a sequence of images of an object with an imaging detector, wherein at least two consecutive images of the sequence of images are spatially shifted relative to each other;
    receiving the sequence of images of the object at a processor, wherein the sequence of images has a mean count of electrons per pixel per image smaller than 0.67;
    transforming, by the processor, each image in the sequence of images into a Fourier domain using a Fourier transform to generate a corresponding plurality of Fourier transformed images;
    calculating, by the processor, an amplitude filtered pattern in the Fourier domain based on amplitude components of the plurality of Fourier transformed images;
    determining, by the processor, spatial shifts for pairs of consecutive images in the sequence of images using the amplitude filtered pattern;
    aligning, by the processor, images in the sequence of images based on the determined spatial shifts; and
    summing, by the processor, the aligned images to form an image-shift-corrected summed image.

2. The method of claim 1, wherein the amplitude filtered pattern calculation comprises:
    summing the amplitude components of the Fourier transformed images to generate an amplitude pattern;
    applying an amplitude threshold to the amplitude pattern to generate the amplitude filtered pattern, wherein the amplitude filtered pattern includes pixels in the amplitude pattern having an amplitude at or above the amplitude threshold.

3. The method of claim 2, wherein the determination of the spatial shifts for the pairs of consecutive images comprises:
    replacing an amplitude component of each of the plurality of Fourier transformed images with the filtered amplitude pattern to form a plurality of filtered Fourier transformed images;
    performing an inverse Fourier Transform on each of the plurality of filtered Fourier transformed images to form a corresponding plurality of reverse transformed, filtered images; and
    cross-correlating the plurality of reverse transformed, filtered images with a consecutive one of the plurality of reverse transformed, filtered images to generate image shift information for the plurality of reverse transformed, filtered images.

4. The method of claim 3, wherein the alignment of the images further comprises:
    applying the image shift information to the images in the sequence of images.

5. The method of claim 2, wherein the determination of the spatial shifts for the pairs of consecutive images further comprises:
    extracting phase components from each of the plurality of Fourier transformed images corresponding to a plurality of pixels in the filtered amplitude pattern, wherein the plurality of pixels correspond to pixels in the amplitude pattern having an amplitude at or above the amplitude threshold;

selecting at least one pair of pixels from the plurality of pixels in each image of the plurality of Fourier transformed images; and determining an image shift vector for each image of the plurality of Fourier transformed images based on the extracted phase components for the selected at least one pair of pixels.

6. The method of claim 5, wherein the determination of the image shift vector further comprises:

determining at least two non-collinear image shift component vectors of the image shift vector based on the extracted phase components for the selected at least one pair of pixels;

doubling a modulus of the at least two non-collinear image shift component vectors;

determining an image shift circle based on the doubled modulus of the at least two non-collinear image shift component vectors, wherein the image shift vector corresponds to a radius of the image shift circle.

7. The method of claim 6, wherein a plurality of pairs of pixels are selected each image of the plurality of Fourier transformed images, a plurality of image shift vectors is determined for each of the plurality of pairs of selected pixels, the method further comprising:

identifying image shift vectors of the plurality of image shift vectors deviating more than a predetermined amount from other of the plurality of image shift vectors;

forming a set of image shift vectors from the plurality of image shift vectors, wherein the identified image shift vectors are not included in the set of image shift vectors;

applying a statistical calculation to the set of image shift vectors to generate the determined spatial shifts.

8. The method of claim 1, wherein the sequence of images are received by the processor from the imaging detector of a transmission electron microscope.

9. A system, comprising:

a memory storing processor instructions; and a processor coupled to the memory, wherein the processor is configured to execute the processor instructions stored in memory, which causes the processor to receive a sequence of images of an object, wherein at least two consecutive images of the sequence of images are spatially shifted relative to each other, wherein the sequence of images of the object are taken with an imaging detector, and wherein the sequence of images has a mean count of electrons per pixel per image smaller than 0.67;

transform each image in the sequence of images into a Fourier domain using a Fourier transform to generate a corresponding plurality of Fourier transformed images;

calculate an amplitude filtered pattern in the Fourier domain based on amplitude components of the plurality of Fourier transformed images;

determine spatial shifts for pairs of consecutive images in the sequence of images using the amplitude filtered pattern;

align images in the sequence of images based on the determined spatial shifts; and sum the aligned images to form an image-shift-corrected summed image.

10. The system of claim 9, wherein the processor instructions cause the processor to calculate the amplitude filtered pattern by:

summing the amplitude components of the Fourier transformed images to generate an amplitude pattern;

applying an amplitude threshold to the amplitude pattern to generate the amplitude filtered pattern, wherein the amplitude filtered pattern includes pixels in the amplitude pattern having an amplitude at or above the amplitude threshold.

11. The system of claim 10, wherein the processor instructions cause the processor to determine the spatial shifts for the pairs of consecutive images by:

replacing an amplitude component of each of the plurality of Fourier transformed images with the filtered amplitude pattern to form a plurality of filtered Fourier transformed images;

performing an inverse Fourier Transform on each of the plurality of filtered Fourier transformed images to generate a corresponding plurality of reverse transformed, filtered images; and cross-correlating the plurality of reverse transformed, filtered images with a consecutive one of the plurality of reverse transformed, filtered images to generate image shift information for the plurality of reverse transformed, filtered images.

12. The system of claim 11, wherein the processor instructions cause the processor to align the images by:

applying the image shift information to the images in the sequence of images.

13. The system of claim 10, wherein the processor instructions cause the processor to determine the spatial shifts for the pairs of consecutive images by:

extracting phase components from each image of the plurality of Fourier transformed images corresponding to a plurality of pixels in the filtered amplitude pattern, wherein the plurality of pixels correspond to pixels in the amplitude pattern having an amplitude at or above the amplitude threshold;

selecting at least one pair of pixels from the plurality of pixels in each image of the plurality of Fourier transformed images; and determining an image shift vector for each image of the plurality of Fourier transformed images based on the extracted phase components for the selected at least one pair of pixels.

14. The system of claim 13, wherein the processor instructions cause the processor to determine the image shift vector by:

determining at least two non-collinear image shift component vectors of the image shift vector based on the extracted phase components for the selected at least one pair of pixels;

doubling a modulus of the at least two non-collinear image shift component vectors;

determining an image shift circle based on the doubled modulus of the at least two non-collinear image shift component vectors, wherein the image shift vector corresponds to a radius of the image shift circle.

15. The system of claim 14, wherein the processor instructions cause the processor to select a plurality of pairs of pixels are selected each image of the plurality of Fourier transformed images, a plurality of image shift vectors is determined for each of the plurality of pairs of selected pixels, and the processor instructions further cause the processor to:

identify image shift vectors of the plurality of image shift vectors deviating more than a predetermined amount from other of the plurality of image shift vectors;

form a set of image shift vectors from the plurality of image shift vectors, wherein the identified image shift vectors are not included in the set of image shift vectors;

apply a statistical calculation to the set of image shift vectors to generate the determined spatial shifts.

16. The system of claim 9, further comprising:

an electron gun;

the imaging detector; and an object holder interposed between the electron gun and the imaging detector, wherein processor receives the sequence of images of the object from the imaging detector.

17. A method, comprising:

obtaining a sequence of images of an object, with an imaging detector;

receiving the sequence of images of the object at a processor, wherein the sequence of images has a mean count of electrons per pixel per image smaller than 0.67;

calculating, by the processor, an amplitude filtered pattern in a Fourier domain based on amplitude components of a plurality of Fourier transformed images of the sequence of images;

replacing, by the processor, an amplitude component of the plurality of Fourier transformed images with the amplitude pattern to form a plurality of filtered Fourier transformed images;

performing, by the processor, an inverse Fourier transform on the plurality of filtered Fourier transformed images to form a corresponding plurality of reverse transformed, filtered images;

determining, by the processor, image shift information using the plurality of reverse transformed, filtered images; and applying, by the processor, the image shift information to images in the sequence of images to form a plurality of aligned images.

18. The method of claim 17, further comprising:

summing the plurality of aligned images to form an image-shift-corrected summed image.

19. The method of claim 17, further comprising:

outputting the image-shift-corrected summed image on a display.

20. The method of claim 17, wherein the determination of the image shift information comprises:

cross-correlating the plurality of reverse transformed, filtered images with a consecutive one of the plurality of reverse transformed, filtered images to generate the image shift information for the plurality of reverse transformed, filtered images.

* * * * *